United States Patent [19]

Soots

[11] Patent Number: 4,913,687

[45] Date of Patent: Apr. 3, 1990

[54] POWER-TRANSMISSION SHEAVE HAVING ENHANCED BELT ENGAGEMENT CAPABILITY

[76] Inventor: Claude A. Soots, Gage County Industrial Park, Beatrice, Nebr. 68310

[21] Appl. No.: 295,589

[22] Filed: Jan. 11, 1989

[51] Int. Cl.[4] .............................................. F16H 55/36
[52] U.S. Cl. ..................................... 474/167; 474/174
[58] Field of Search ................ 474/166, 167, 174–182, 474/188, 189; 29/159 R

[56] References Cited

U.S. PATENT DOCUMENTS

| | | | |
|---|---|---|---|
| 555,924 | 3/1896 | Brigel | 474/174 |
| 1,847,177 | 3/1932 | Freedlander | 474/167 |
| 2,176,335 | 10/1939 | Gray | 474/167 |
| 2,647,409 | 8/1953 | Keim | 474/167 X |

Primary Examiner—Thuy M. Bui
Attorney, Agent, or Firm—George R. Nimmer

[57] ABSTRACT

Power-transmission sheaves conventionally include a centrally-open and shaft-engageable hub portion surrounding a directionally transversely extending hub-axis and together with at least one grooved belt-training portion that is surroundably connected to the hub portion and that provides a grooved outward periphery for the sheave. The at least one belt-training portion includes transversely separated flanged sides for the belt-training groove. Such conventional power-transmission sheaves are given enhanced belt engagement by providing one, or preferably both, of the flanged sides with a plurality of transversely extending openings therethrough.

11 Claims, 1 Drawing Sheet

POWER-TRANSMISSION SHEAVE HAVING ENHANCED BELT ENGAGEMENT CAPABILITY

BACKGROUND OF THE INVENTION

Drawing FIG. 1 is a sectional elevational view of a conventional power-transmission sheave (8) that includes a centrally-open (11) hub portion 10 surrounding a directionally transversely extending hub-axis 9 that is surroundably engageable with a shaft 7 (depicted in phantom line). In the latter regard, hub portion 10 is provided with a threaded aperture 12 to accommodate a set-screw 6 (depicted in phantom line) for engaging the herein keyed shaft 7. In addition to hub portion 10, conventional sheave 8 includes at least one grooved (21) belt-training portion 20 and which groove 21 (at its base 22) circularly concentrically surrounds hub-axis 9 whereby belt-training portion 20 provides the sheave outward periphery 29. The at least one belt-training groove 21 is sidewardly defined by transversely separated flanged sides 30 and 40, the latter being sometimes divergent to provide the "V"-shaped groove depicted in FIG. 1. Power-transmission belt 5 (depicted in phantom line) is trained about and is co-rotatable with shaft 7 and sheave 8. In such co-rotatable condition, the belt lower portion (i.e. that adjacent groove base 22) is in compression and belt upper portion (i.e. that remote from groove base 22) is in tension. An elevational view of conventional sheave 8 and taken along line 1A—1A would be substantially identical to FIG. 3, except lacking openings 31 and 41.

GENERAL OBJECTIVE OF THE INVENTION

It is the general objective of the present invention to enhance the belt engagement capability of conventional power-transmission sheaves or pulleys.

GENERAL STATEMENT OF THE INVENTION

WIth the above general objective in view, and together with other ancillary and related objective which will become more apparent as this description proceeds, the improved power-transmission sheave of the present invention generally comprises providing one, and preferably both, of the groove-flanking flanged sides with a plurality of directionally transversely extending openings and which openings greatly enhance the sheave belt engagement capability.

BRIEF DESCRIPTION OF THE DRAWING

In the drawing, wherein like characters refer to like parts in the several views, and in which.

DETAILED DESCRIPTION OF THE DRAWING

Figure 3:
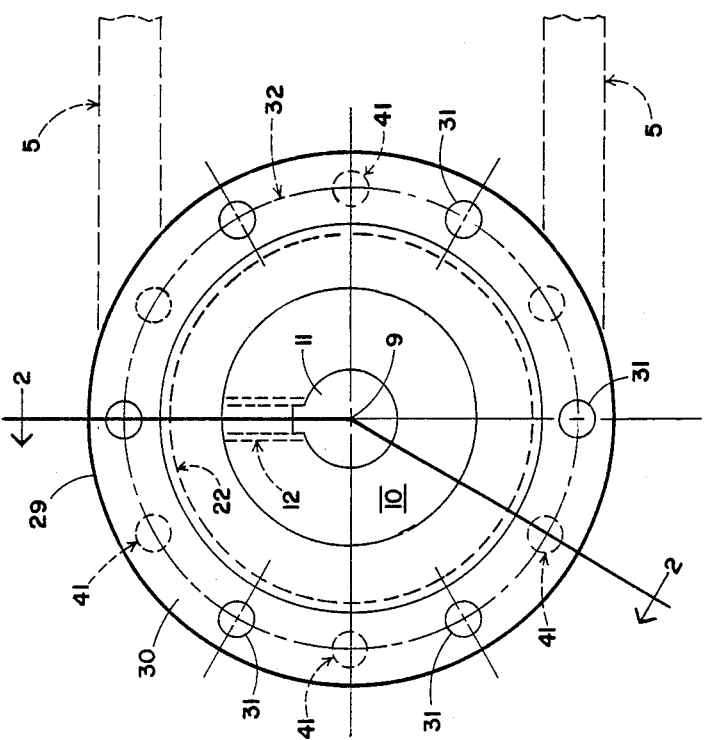
FIG. 3 is a side elevational view taken along line 3—3 of FIG. 2.
Figure 2:
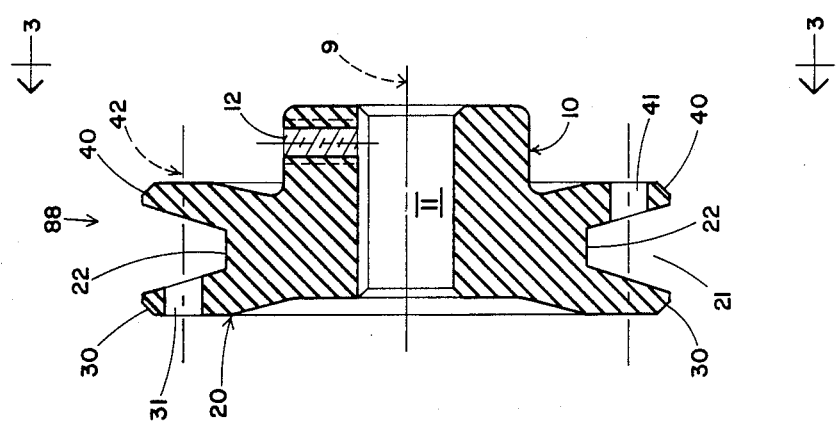
FIG. 2 is a sectional elevational view similar to FIG. 1 and showing a representative embodiment (88) of the improved sheave or pulley of the present invention i.e. having enhanced belt engaging capability.
Figure 1:
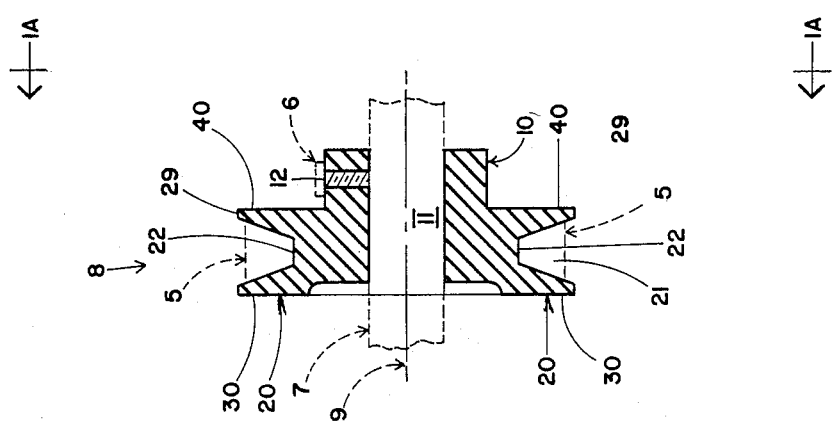
FIG. 1 aforedescribed, in a sectional elevational view of a representative power-transmission sheave or pulley of the prior art.

The improved pulley or sheave 88 of drawing FIGS. 2 and 3 differ from the FIG. 1 conventional type in that the sheave flanged sides 30 and 40 are each augmented with a plurality of transversely extending openings 31 and 41 therethrough. Transversely extending openings 31 and 41 lie along circular-loci 32 and 42, respectively, and which loci (32, 42) circularly concentrically surround hub-axis 9. Such openings 31 (e.g. herein six in number) can be spaced at substantially equal intervals along circular-locus 32, and such openings 41 (e.g. herein six in number) can be spaced at substantially equal intervals along circular-locus 42. Preferably, the openings 31 and 41 are "out-of-phase" along loci 32 and 42 whereby no first-flange opening (31) is transversely aligned with a second-flange opening (41).

Though sheaves 8 and 88 are employed identically with shafts (7) and belts (5), the multi-openings (31, 41) type sheave as generally depicted in FIGS. 2 and 3 has greatly enhanced belt engagement capability over the prior art pulleys and sheaves (e.g. 8 of FIGS. 1). The exact reason for such greatly enhanced belt engagement capability is not known with certainty. However, it is theorized that, as the sheave rotates about hub-axis 9, the rubbery undercord of running trained belt 5, which is in compression, bulges into and thereby momentarily releasably grips within the flange openings (31, 41). In a related vein, the presence of such flange openings seemingly scrub foreign material and moisture from the belt and eject same through the transversely extending openings (31, 41).

From the foregoing, the construction and operation of the power-transmission sheave having enhanced belt engagement capability will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling with the scope of the appended claims.

What is claimed as follows:

1. In a power-transmission sheave conventionally comprising a centrally-open and shaft-engageable hub portion generally concentrically surrounding a directionally transversely extending hub-axis and further comprising at least one grooved belt-training portion that is surroundably connected with said hub portion and provides a grooved outward periphery for said sheave, said at least one belt-training portion including transversely separated flanged sides for the belt-training groove, the improvement of means for enhancing the sheave's engagement with a power-transmission belt guidably locatable within said plural flanges belt-training portion and said enhancement means comprising: providing at least one of said flanged sides with a plurality of directionally transversely extending openings therethrough.

2. The improved sheave of claim 1 wherein both transversely separated flanged sides are provided with said directionally transversely extending openings.

3. The improved sheave or claim 2 wherein the transversely extending openings of one flange are out-of-phase with the transversely extending openings of the other flange.

4. The improved sheave of claim 1 wherein said transversely extending openings for the belt-training portion lie along a circular-locus that concentrically surrounds said hub-axis.

5. The improved sheave of claim 4 wherein said transversely extending openings for the belt-training portion are spaced at substantially equal intervals along said circular-locus.

6. The improved sheave of claim 5 wherein both flanged sides are provided with transversely extending openings and wherein the openings of one flange are out-of-phase with the transversely extending openings of the other flange.

7. The improved sheave of claim 6 wherein the flanged sides are divergent to provide a "V"-shaped belt-training groove.

8. The improved sheave of claim 1 wherein the flanged sides are divergent to provide a "V"-shaped belt-training groove.

9. In a power-transmission device conventionally comprising a sheave symmetrically surrounding a transversely extending hubaxis and including at least a pair of transversely spaced-apart peripheral flanges guiding therebetween a power-transmission belt that includes in some transversely extending cross-sectional portion thereof a resiliently compressible material, the improvement of means for enhancing the sheave's engagement with said guided power-transmission belt and said engagement means comprising: providing for both of said sheave flanges, and in transverse alignment with the belt resiliently compressible material, a plurality of directionally transversely extending openings therethrough, whereby during powered rotation of said sheave the resiliently compressible portion of the power-transmission belt protrudes momentarily into said transversely extending sheave openings.

10. The improved power-transmission device of claim 9 wherein, for each said sheave flange, said transversely extending openings lie along some circular-locus that concentrically surrounds said hubaxis. axis.

11. The improved power-transmission device of claim 10 wherein, at each said sheave flange circular-locus, said transversely extending openings are spaced at substantially equal intervals therealong.

* * * * *